United States Patent [19]
Maytag

[11] 3,759,142
[45] Sept. 18, 1973

[54] AIR SPRING CYLINDER ASSEMBLIES
[75] Inventor: John Hardy Maytag, Denver, Colo.
[73] Assignee: Coors Container Company, Golden, Colo.
[22] Filed: Oct. 8, 1971
[21] Appl. No.: 187,629

[52] U.S. Cl. .................. 91/396, 91/417, 91/469
[51] Int. Cl. ................. F15b 15/22, F15b 15/17
[58] Field of Search ............... 91/396, 390, 417, 91/52; 92/129; 74/567, 569

[56] References Cited
UNITED STATES PATENTS
| | | | |
|---|---|---|---|
| 2,493,783 | 1/1950 | Stancliff | 74/569 |
| 2,598,446 | 5/1952 | Schneider | 91/396 |
| 2,931,218 | 4/1960 | Ottestad | 91/396 |
| 3,158,067 | 11/1964 | Wagner | 91/417 R |
| 3,486,416 | 12/1969 | Eastman | 91/396 |

*Primary Examiner*—Paul E. Maslousky
*Attorney*—Bertha L. MacGregor

[57] ABSTRACT

An air spring cylinder assembly for maintaining contact between a cam and its follower in a machine wherein a machine element is actuated by cam and follower mechanism, comprising an air cylinder, a rod and piston reciprocably mounted in the cylinder, the piston having a contoured nose which is non-uniform in diameter and movable in axial directions in an orifice bushing to vary the rate of air escape from the rear of the piston, including a pressurized air supply and valve means admitting air continuously to an air chamber rearward of the piston and alternately admitting and exhausting air from an air chamber forward of the piston to thereby produce close correspondence between actual and required force to restrain the machine element.

8 Claims, 5 Drawing Figures

INVENTOR.
JOHN HARDY MAYTAG
BY
Bertha L. MacGregor
ATTORNEY

INVENTOR.
JOHN HARDY MAYTAG
BY
Bertha L. MacGregor
ATTORNEY

INVENTOR.
JOHN HARDY MAYTAG
BY
Bertha L. MacGregor
ATTORNEY

AIR SPRING CYLINDER ASSEMBLIES

This invention relates to an air spring cylinder assembly for maintaining contact between a cam and its follower in machines wherein the machine element which is required to be moved is of such configuration that it may not be actuated by simple linkages. Since the engagement of the cam surface with that of the follower constitutes an open link capable of imparting force in only one direction, some means must be provided for maintaining contact between the cam and follower throughout the cycle. This object is achieved by the pneumatic cylinder assembly shown and described herein.

One of the prior art methods of maintaining contact between a cam and its follower is to provide a groove in the cam of desired cam curve, of such width as to confine the follower more of less closely between the sides of the groove. Since each complete cam cycle, of which there may be several for each revolution or stroke of the cam, involves an acceleration and a deceleration, the reversal of forces causes the follower to bear alternately on opposite sides of the groove, which results in a certain amount of impact at the point of reversal, requiring the follower to reverse its direction of rotation instantly. This mechanism, therefore, is unsuitable for applications requiring long life or very smooth operation.

Another prior art method is to provide two complementary or conjugate pairs of cam and follower, by which one pair works against the other in such relationship that the slack or backlash in the system may be eliminated or reduced to any desired amount. This has the advantage of transmitting force positively in either direction, but the disadvantage of being bulky and difficult to construct with sufficient accuracy for any but the simplest machine motions.

The employment of spring pressure to maintain contact between cam and follower provides a simple means which results in zero backlash with minimal accuracy requirements, but an important disadvantage is that in part of the cycle where the acceleration is positive, causing pressure between the cam and follower, the spring pressure is additive to that caused by acceleration. As the minimum spring pressure must be greater than the maximum decelerative force, the load between cam and follower is slightly greater than the sum of the accelerative and decelerative forces, causing relatively high loads on cam and follower. In many cases, the spring load makes the machine, of which the mechanism is a part, difficult to jog or to turn over manually for set-up adjustment or otherwise. Springs also have dynamic characteristics which make them unsuitable for certain moderate or high speed applications.

The object of this invention is to overcome the objections to and disadvantages of prior art methods of maintaining contact between cam and follower. To achieve this object, a pneumatic cylinder is used in the same manner as a spring, with the advantage that the force supplied by the cylinder assembly may conveniently be varied from near zero to any desired maximum, in many cases in close conformity to the optimum pressure curve.

The invention may be embodied in machines of various kinds where cams and followers are utilized as part of the mechanism for imparting motion to a machine element, such, for example, in a metal working cam and follower press mechanism wherein reciprocatory motion is imparted to a sleeve or other slidably mounted element.

Figure 1:
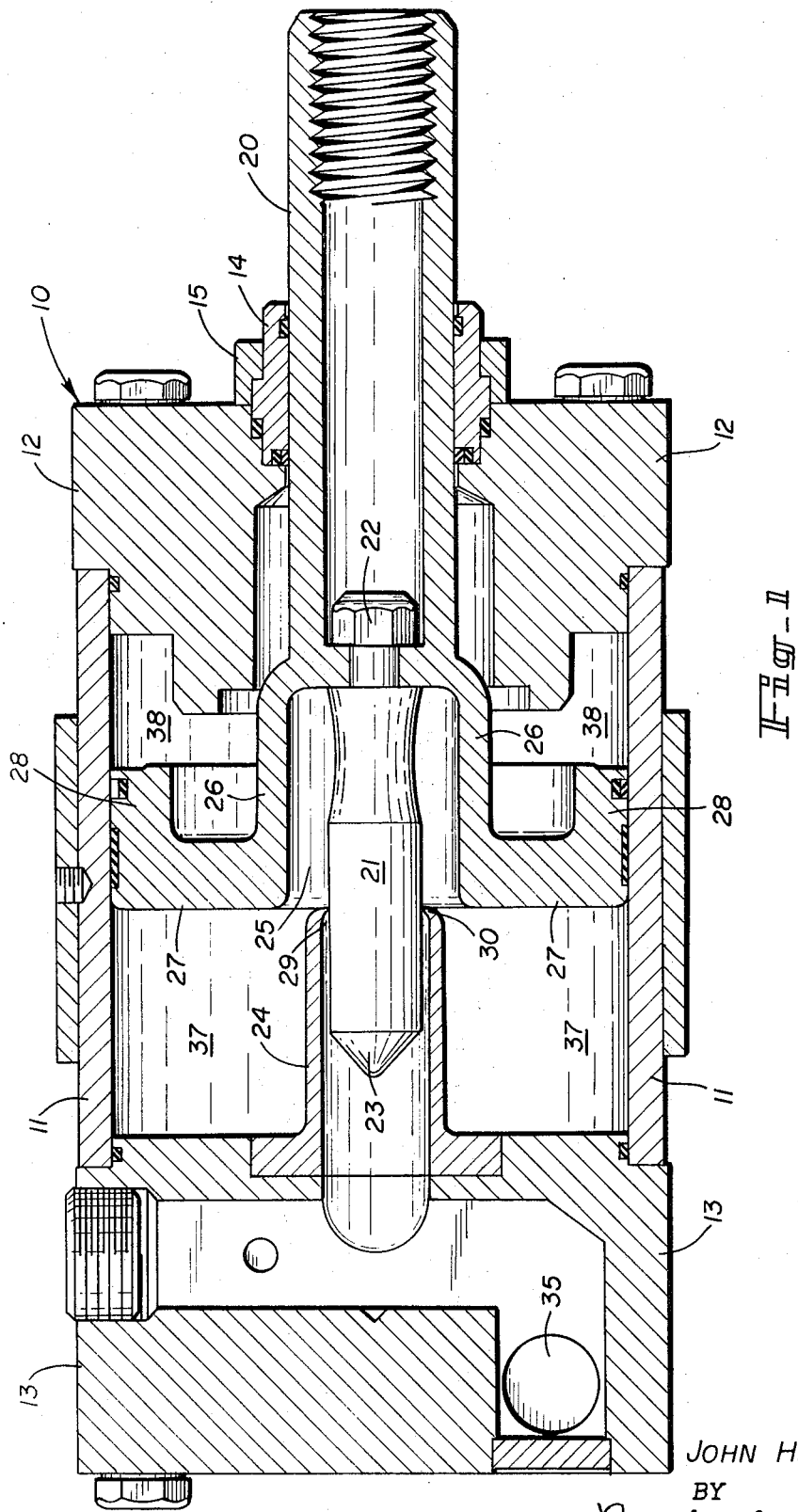
FIG. 1 is a longitudinal sectional view, partly in side elevation, of an air spring cylinder assembly embodying my invention.

In the embodiment of the invention shown in the drawings, the air cylinder assembly 10 comprises a cylinder tube 11, rod end cover 12, blind end cover 13, piston rod bearing 14, and bearing retainer plate 15. A piston rod 20 is provided with a cushion nose 21 secured to the piston rod by an elastic nut 22 at the inner end of the nose 21 which is of slightly smaller diameter than the free end 23 which extends into an orifice bushing 24 mounted in the blind end cover 13. The piston rod 20 is slidable in the bearing 14 provided with suitable O-ring seals as shown.

An annular space 25 is provided between the inner portion of the cushion nose 21 and the cup shaped rearward end 26 of the piston rod 20. The cup shaped end 26 of the piston rod merges into the radially extending flange 27 terminating in a circumferential member 28 in sliding engagement with the inner surface of the cylinder tube 11. The outer surface 23 of the cushion nose 21 is contoured so as to provide an annular orifice 29 between it and the inwardly turned edge 30 of the bushing 24, the area of the orifice varying as the cushion nose 21 moves axially through the edge 30 of the bushing 24. The width of the orifice, in radial direction, is quite restricted, depending of course on the size of the machine.

The blind end cover 13 is provided with a check valve 35 through which air under pressure is conveyed from a pressure tank 36 (FIGS. 2–5) to the chamber 37 rearwardly of the piston. The pressure return line is designated 35'. Air is conveyed to the chamber 38 forwardly of the piston through valve 39 (FIGS. 2–5). The return line from chamber 38 is designated 39'. The valve 39 may be fed from any suitable source of pressurized air.

The piston rod 20 is actuated by a cam 40 and follower 41, the latter being operatively connected to the piston rod 20 and to the machine element it is intended to operate, by linkage (not shown) suitable for the particular mechanism in which the air cylinder assembly may be installed. The slide weight of the machine element is designated 250 lbs.

The operation of the air cylinder assembly will be described by reference to the diagrammatic views of FIGS. 2–5, the acceleration figures for each position referring to the dynamics of the cam surface at the illustrative relative positions of cam and follower at, say, 150 RPM of the cam. The cylinder area is 28.27 and the rod area is 3.142.

Air is admitted to the chamber 37 at the rear surface of the piston 28 from the surge tank 36 through check valve 35 and is discharged from the chamber 37 into the surge tank through orifice bushing and pressure return line 35'. Pressure in the surge tank is maintained at a suitable value, in the illustrated case, 40 p.s.i. Air is alternately admitted to and exhausted from the chamber 38 at the front surface of the piston members 26, 27, 28, through valve and lines 39, 39'.

Figure 2:
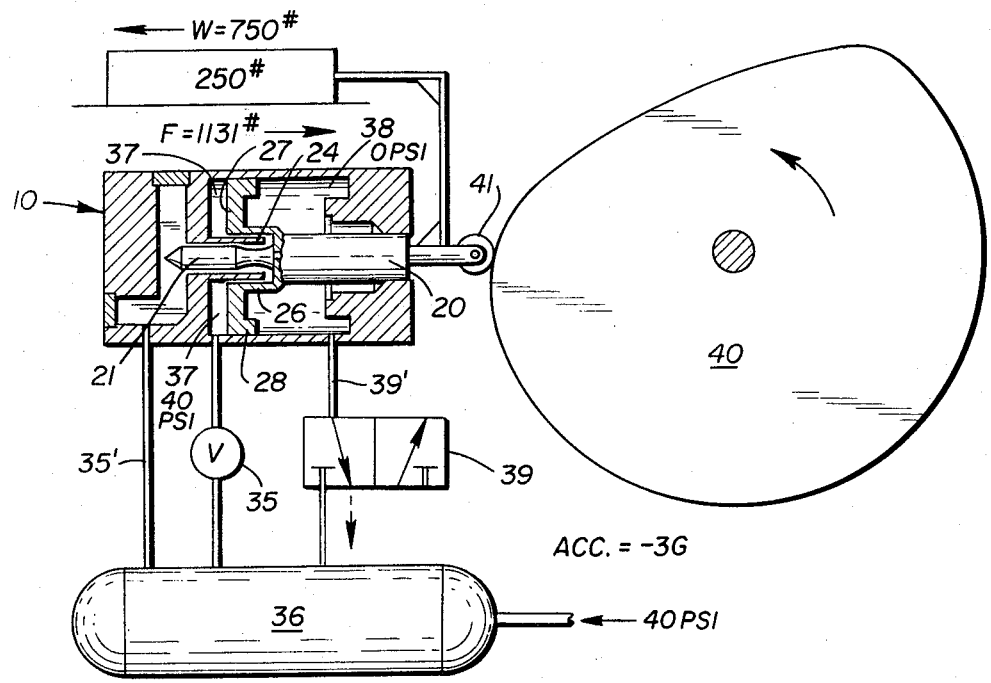
FIG. 2 is a diagrammatic view of the air spring cylinder assembly and a cam and follower, showing the cam and follower in a position wherein the instantaneous value of acceleration is −3G.

In the position of the parts shown in FIG. 2, the air pressure in chamber 38 is zero; the instantaneous value of acceleration is −3G, which applied to the slide weight of 250 lbs., results in force of 750 lbs. tending to separate the follower 41 from the cam 40 at this point. Since the only air pressure on the cylinder is that supplied from the surge tank 36 maintained at 40 p.s.i., the cylinder force is 1,131 lbs., resulting in a pressure of 381 lbs. between the cam and follower.

Figure 3:
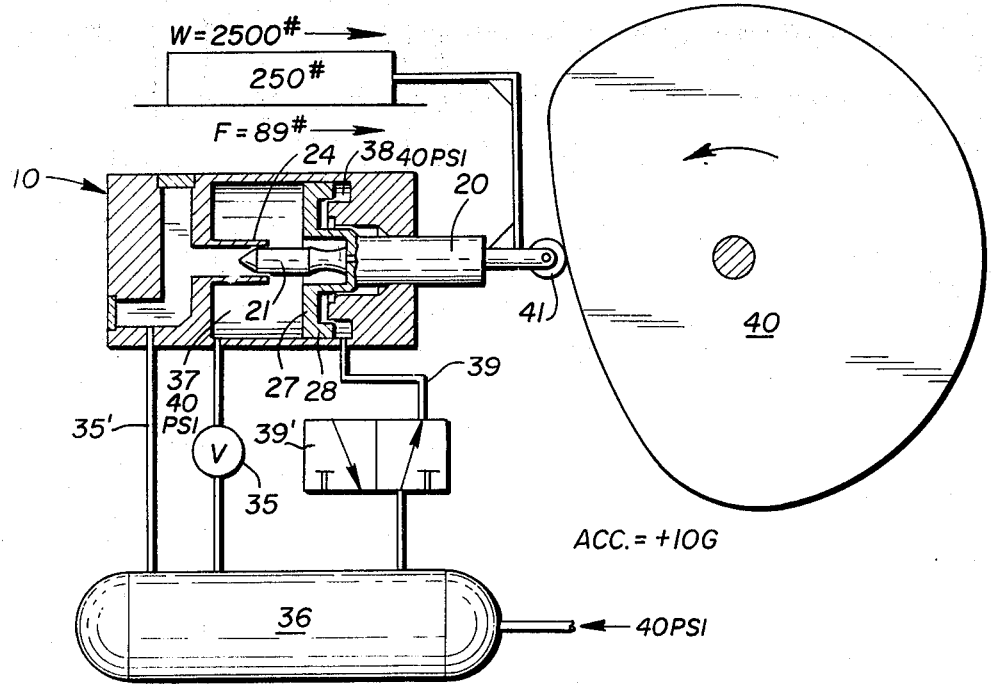
FIG. 3 is a view similar to FIG. 2, showing the cam and follower in a position wherein the acceleration value is 10G.

In the position of the parts shown in FIG. 3, the air pressure in chamber 38 is 40 p.s.i. and in chamber 37 is 40 p.s.i.; the acceleration value is 10G. Pressure is being admitted to the chamber 38 at the front of the piston through valve 39, reducing the total cylinder force from 2,589 to 89 lbs., which is sufficient to maintain contact between the cam and follower in case the machine should be stopped at this point.

Figure 4:
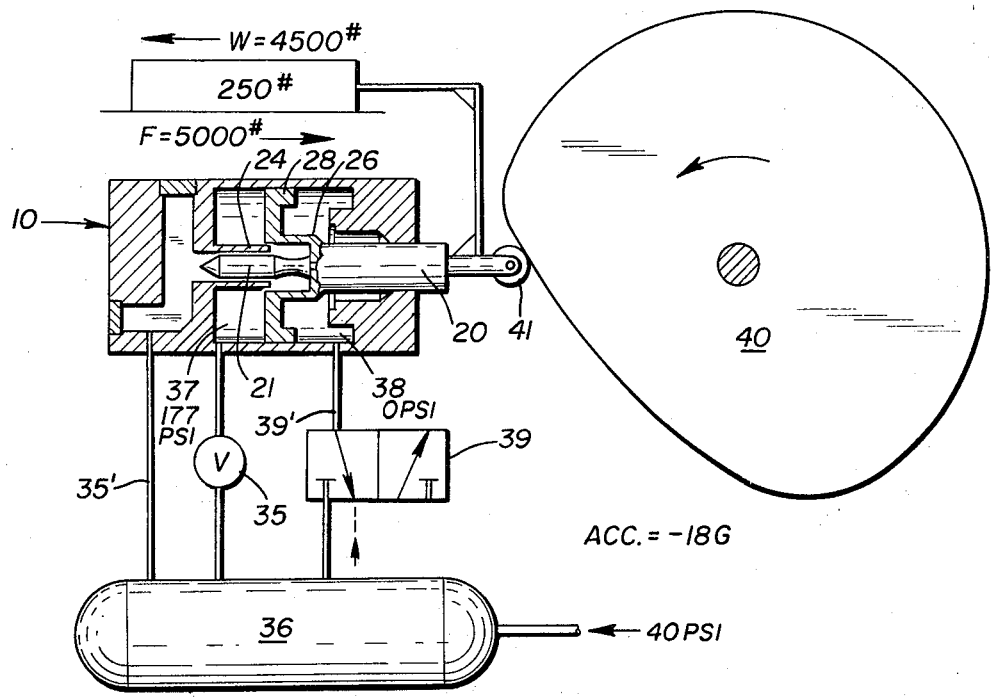
FIG. 4 is a view similar to FIG. 2, showing the cam and follower in a position wherein the acceleration value is −18G.

In the position of the parts shown in FIG. 4, the air pressure in chamber 38 is zero; the acceleration is −18G, causing a force of 4,500 lbs. tending to separate the follower from the cam. At this point, the contoured diameter of the cushion nose 21, fitting the cushion orifice bearing 24 quite closely, restricts the passage of air from the chamber 37 at the rear of the piston into the surge tank 36, causing the air pressure to rise momentarily to 177 p.s.i. The cylinder force is 5,000 lbs., resulting in a total load on the cam follower of 500 lbs.

Figure 5:
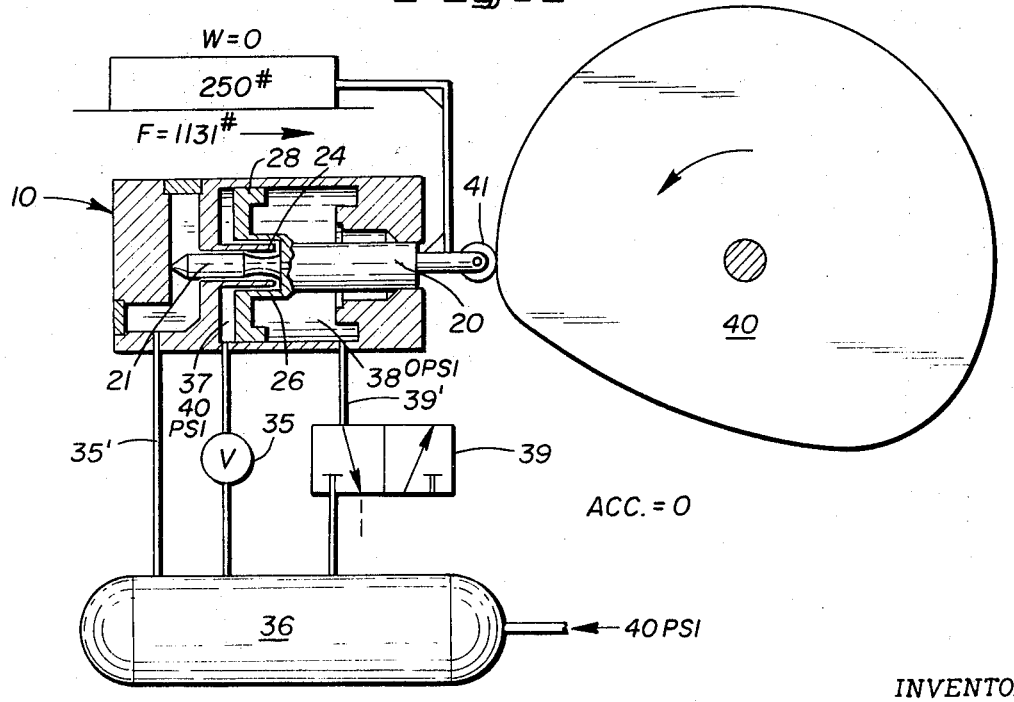
FIG. 5 is a view similar to FIG. 2, showing the cam and follower in a position wherein the acceleration value is zero and the follower is stationary.

In the position of the parts shown in FIG. 5, the air pressure in chamber 38 is zero, and in chamber 37 is 40 p.s.i.; acceleration of the cam is zero and the follower and piston are stationary. Due to the larger cushion orifice existing in this position of parts, and the slow motion, the excess air which caused the increased pressure has returned to the surge tank and the cylinder force is again 1,131 lbs. which is also the net force on the follower 41.

Between the positions of the parts as shown in FIGS. 3 and 4, the cylinder force varies because of the contoured diameter of the cushion nose, the variable rate of displacement and the adiabatic temperature/pressure relation varying the pressure at the back of the piston, producing a closer correspondence of actual to required force than is possible with a simple spring or cylinder. The pressure regulating feature of the cushion nose and orifice is proportional to the operating speed, making the device partially self-compensated for speed variation.

The factors described in connection with the diagrammatic views of FIGS. 2–5, such as the slide weight of the machine element, the pressures of the air admitted to chambers 37 and 38, the forces exerted by the piston, and the acceleration values of the cam in its several positions, may vary for different assemblies. As indicated by the example described in said figures, air is admitted to the forward chamber 38 when the cam is in positive gravity position and the pressure in the cylinder is thus neutralized. In other words, air is admitted to the chamber 38 only when the acceleration value of the cam is positive so as not to require any restraining force by the cylinder.

For want of space, the details of the orifice bushing 24 such as the inturned edge 30 have not been shown in the diagrammatic views, FIGS. 2–5. These important details, described in the specification, are shown in FIG. 1. The specification describes the air pressures in chambers 37 and 38. These pressures also are noted in FIGS. 2–5 adjacent the numerical designations, but could not be placed within the said chambers 37, 38, for want of space.

I claim:

1. An air spring cylinder for maintaining contact between a cam and its follower in a machine wherein a machine element is actuated by cam and follower mechanism comprising
   a. a rotated cam,
   b. a cam follower contacted by the cam operatively connected to a machine element to be actuated by the follower,
   c. an air cylinder,
   d. a rod and piston reciprocably mounted in the cylinder,
   e. a contoured cushion nose having non-uniform diameters connected to the piston rod within the cylinder,
   f. air chambers in the cylinder located forwardly and rearwardly, respectively, of the piston,
   g. an orifice bushing mounted in the rearward air chamber to receive the cushion nose in positions varying in axial directions in the orifice bushing to thereby vary the rate of air escape from the rearward air chamber,
   h. a pressurized air supply,
   i. valve means admitting air continuously to the rearward air chamber to supply predetermined initial pressure, and a pressure return line discharging excess air from said rearward air chamber, and
   j. valve means alternately admitting to and exhausting air from the forward air chamber, said air admitting means varying the cylinder force applied to the machine element to produce close correspondence between actual and required force to restrain the machine element.

2. The air spring cylinder assembly defined by claim 1, in which the contoured cushion nose has a substantially uniform diameter body portion slightly spaced radially from the orifice bushing when located therein and a portion concaved in axial direction and smaller in diameter than said uniform diameter body portion between said body portion and piston rod, whereby movement of the piston and nose in axial direction varies the rate of air escape from the rear of the piston.

3. The air spring cylinder assembly defined by claim 1, in which the piston comprises a cup shaped central portion opening into the rearward air chamber, merging into a radially extending flange which terminates in a circumferential member slidably engaging the cylinder.

4. The air spring cylinder assembly defined by claim 3, in which the cup shaped central portion of the piston is spaced from the cushion nose forming an annular air space which communicates with the rearward air chamber.

5. The air spring cylinder assembly defined by claim 4, in which the orifice bushing enters the annular air space between the cup shaped portion of the piston and the cushion nose in certain positions of the piston.

6. The air cylinder assembly defined by claim 1, in which air is admitted to the forward chamber only when the acceleration value of the cam is positive so as not to require any restraining force by the cylinder.

7. The air cylinder assembly defined by claim 2, in which air is admitted to the forward chamber only when the acceleration value of the cam is positive so as not to require any restraining force by the cylinder.

8. The air cylinder assembly defined by claim 1, in which the orifice bushing is a sleeve having an inner diameter slightly larger than the diameter of the piston nose to provide an annular space between them and an inturned edge which reduces the area of the annular space between the orifice bushing and nose at the edge of the bushing.

* * * * *